United States Patent [19]
Ariyavisitakul

[11] Patent Number: 5,809,086
[45] Date of Patent: Sep. 15, 1998

[54] INTELLIGENT TIMING RECOVERY FOR A BROADBAND ADAPTIVE EQUALIZER

[75] Inventor: Sirikiat Ariyavisitakul, Tinton Falls, N.J.

[73] Assignee: Lucent Technologies Inc., Murray Hill, N.J.

[21] Appl. No.: 618,741

[22] Filed: Mar. 20, 1996

[51] Int. Cl.[6] ............................. H04L 27/22; H04L 7/00
[52] U.S. Cl. ............................. 375/332; 375/355
[58] Field of Search .................. 375/229, 233, 375/231, 232, 355, 365, 332, 329; 370/509; 329/304

[56] References Cited

U.S. PATENT DOCUMENTS

| | | | |
|---|---|---|---|
| 4,320,517 | 3/1982 | Godard et al. | 375/232 |
| 4,397,019 | 8/1983 | Alvarez et al. | 370/324 |
| 5,170,415 | 12/1992 | Yoshida et al. | 375/326 |
| 5,185,764 | 2/1993 | Baier | 375/231 |
| 5,199,047 | 3/1993 | Koch | 375/231 |
| 5,222,101 | 6/1993 | Ariyavisitakul et al. | 375/231 |
| 5,444,739 | 8/1995 | Uesugi et al. | 375/232 |

*Primary Examiner*—Tesfaldet Bocure

[57] ABSTRACT

A timing recovery process for digital receivers employing decision-feedback equalization (DFE) or delayed decision-feedback sequence estimation (DDFSE) can be executed prior to equalization, minimizes training complexity, and provides fast equalizer start-up for transmissions of short packets. The optimum symbol timing and burst timing is determined by (i) calculating a signal-to-intersymbol interference-plus-noise ratio (SINR) index by estimating the channel impulse response and the noise power, and (ii) varying the symbol timing and the burst timing to maximize the calculated SINR index. The timing recovery process particularly improves performance of a digital receiver utilizing (a) decision-feedback equalizer structures in which the delay spread is large compared to the span of the feedforward filter, and (b) equalizer structures based on delayed decision-feedback sequence estimation in which the delay spread is large compared to the memory of the Viterbi sequence estimator section.

19 Claims, 4 Drawing Sheets

INTELLIGENT TIMING RECOVERY FOR A BROADBAND ADAPTIVE EQUALIZER

FIELD OF THE INVENTION

The invention relates generally to broadband wireless radio communication, and more particularly to reduced complexity timing recovery and high-speed equalization techniques for broadband wireless radio channels.

BACKGROUND OF THE INVENTION

Wireless communications have become a focus of worldwide research activities. Next-generation mobile and fixed radio wireless systems will provide a wide variety of integrated multi-media services and increased system capacity. Compared to today's cellular systems, next-generation mobile or fixed wireless systems will likely present a much higher channel bit rate capability, e.g., 10 Mbits/s to provide 1 Mbit/s multimedia services to multiple users within each coverage area. Broadband wireless techniques, such as multicarrier modulation and adaptive equalization, will be necessary to overcome the effects of multipath delay spread over mobile radio channels.

High-speed indoor LANs and broadband outdoor fixed and mobile wireless systems are important wireless communication environments. The bit rates in broadband wireless environments are far in excess of the correlation bandwidths. The symbol rate-delay spread product can be on the order of 100. This means that conventional equalizer structures used for such applications require at least 100 taps. The possible transmission bit rates can range from 10 Mbits/s for outdoor systems to 100 Mbits/s for indoor systems, assuming the use of quaternary phase shift keying (QPSK), and given a maximum channel dispersion of 20 $\mu$s for outdoor environments (as specified for the GSM system) and 2 $\mu$s for indoor environments. Presently, equalizers that can achieve acceptable performance in such wireless communication environments are complex and costly.

Decision-feedback equalization (DFE) and delayed decision-feedback sequence estimation (DDFSE) are two useful equalization techniques. In order to apply these techniques to broadband wireless communications, however, it is important to minimize the complexity of these equalizers by reducing the number of taps used in the feedforward section (the feedforward section of a DDFSE structure is a Viterbi sequence estimator). In the conventional design, the number of taps (the spans) of both the feedforward section and the feedback filter of the equalizer must be at least as large as the maximum dispersion of the channel, i.e., on the order of 100 for broadband wireless channels. In a reduced-complexity design, the span of the feedforward section is typically much smaller than the channel dispersion.

Optimum symbol timing and burst timing selection becomes very important when the channel dispersion length is much larger than the span of the feedforward section of the equalizer; especially since the burst timing determines the amount of signal energy to be captured by the feedforward section of the equalizer as well as the amount of residual intersymbol interference (ISI) to be tolerated by the receiver. The choice of optimum burst timing varies depending on the instantaneous shape of the channel impulse response. Without a good timing recovery technique, the feedforward section would need to be as long as the channel dispersion length (i.e., the conventional design), and thus would be too complex and costly for broadband wireless communications.

Previous techniques for optimum burst timing selection either: (a) give poor equalizer performance when the span of the feedforward section is much smaller than the channel dispersion length; or (b) require timing adjustments either during or after training of the equalizer, leading to a prohibitively complex receiver structure and long equalizer training time.

There is a continuing need to minimize equalizer structure complexity without sacrificing performance, and to provide fast start-up in applications for which there is a desire to transmit short packets of information.

SUMMARY OF THE INVENTION

The invention provides a method and system for achieving optimum timing recovery in a digital receiver utilizing (a) decision-feedback equalizer structures in which the delay spread is large compared to the span of the feedforward filter, or (b) equalizer structures based on delayed decision-feedback sequence estimation in which the delay spread is large compared to the memory of the Viterbi sequence estimator section.

According to the preferred embodiment, the optimum symbol timing and burst timing is determined by (i) calculating a signal-to-intersymbol interference-plus-noise ratio (SINR) index by estimating the channel impulse response and the noise power, and (ii) varying a symbol timing parameter and a burst timing parameter to maximize the calculated SINR index. The method is implemented prior to equalization in an open-loop fashion.

Other objects, advantages, and salient features of the invention will become apparent from the following detailed description, which taken in conjunction with the annexed drawing, disclose preferred embodiments of the invention.

DETAILED DESCRIPTION

According to the principles of the invention, an open-loop intelligent timing recovery approach for a digital receiver, which can include a DFE equalizer structure or a DDFSE equalizer structure, enables the optimum symbol timing and burst timing to be implemented prior to equalization in order to improve receiver performance and reduce receiver complexity.

Figure 1:
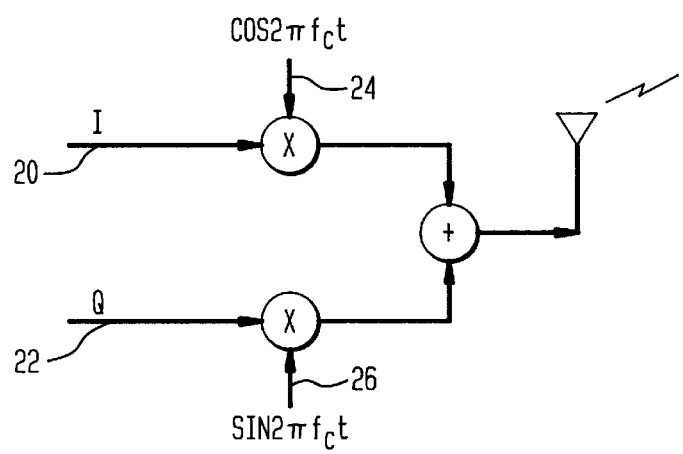
FIG. 1 is a representation of a QPSK transmission system.

An exemplary transmitter, radio link, and receiver system uses a QPSK transmission format at 10 Mbps. In QPSK, there are four possible baseband signal values: an I component value of ±1, and a Q component value of ±j. Referring to FIG. 1, the I component 20 is the in-phase component and the Q component 22 is the quadrature component. The symbol period is 200 ns for each component at 10 Mbps. The sinusoidal carrier signal 24, 26 has a frequency approved by the FCC, e.g., 900 MHz for cellular systems or 2 GHz for PCS systems.

Multipath propagation due to reflections and scattering of radio waves from surrounding buildings and terrain causes problems in wireless telecommunications. For an impulse transmitted in a radio link channel, echoes occur due to the multipath propagation delays, and the transmitted impulse signal is dispersed due to different propagation delays. The high-frequency carrier signals in cellular and PCS applications have small wavelengths. As a user moves by about one-half wavelength of the transmitted signal, the transmitted signal and the echoes of the transmitted signal can become 180° out of phase. Such destructive interference causes fading.

As a result of multipath fading, the channel impulse response of the channel varies as a function of time as the mobile user moves from one location to another. The complex baseband representation of a received signal from the channel can be expressed as (Eq. 1):

$$r_n(\tau) = \Sigma x_{n-k} h_k(\tau) + \eta_n, \text{ for } k \text{ equals } -K_1 \text{ to } K_2.$$

$r_n(\tau)$ is the received signal sampled at time $nT+\tau$, where T is the symbol period, and $\tau$ is the symbol timing phase; $x_m$ is the mth transmitted data symbol ($x_m = \pm 1 \pm j$ for QPSK); $\eta_n$ is the nth sample of additive white Gaussian noise with single-sided power density of $N_o$; and $h_k(\tau) = h(kT+\tau)$ is the kth sample of the (instantaneous) channel impulse response h(t). The channel has a finite response such that $h_k(T)=0$ for $k<-K_1$ and $k>K_2$. The total memory length K of the channel is $K=K_1+K_2$.

The information data of each user are transmitted in either isochronous (i.e., TDMA) or asynchronous packets. The number of information bits in each packet (referred to as "packet length") is varied as a parameter from 400 to 4000 bits. The transmitted packet contains a data portion and overhead symbols.

The overhead symbols include (a) initial guard symbols for energy detection and adaptive gain control (AGC) acquisition, and (b) a sync word used for burst synchronization as well as channel estimation and/or equalizer training.

The sync word is at least twice the memory length of the channel. The sync word is used to estimate channel impulse response and to determine optimum equalizer timing prior to equalization, for both DFE and DDFSE equalization structures in the invention.

Figure 2:
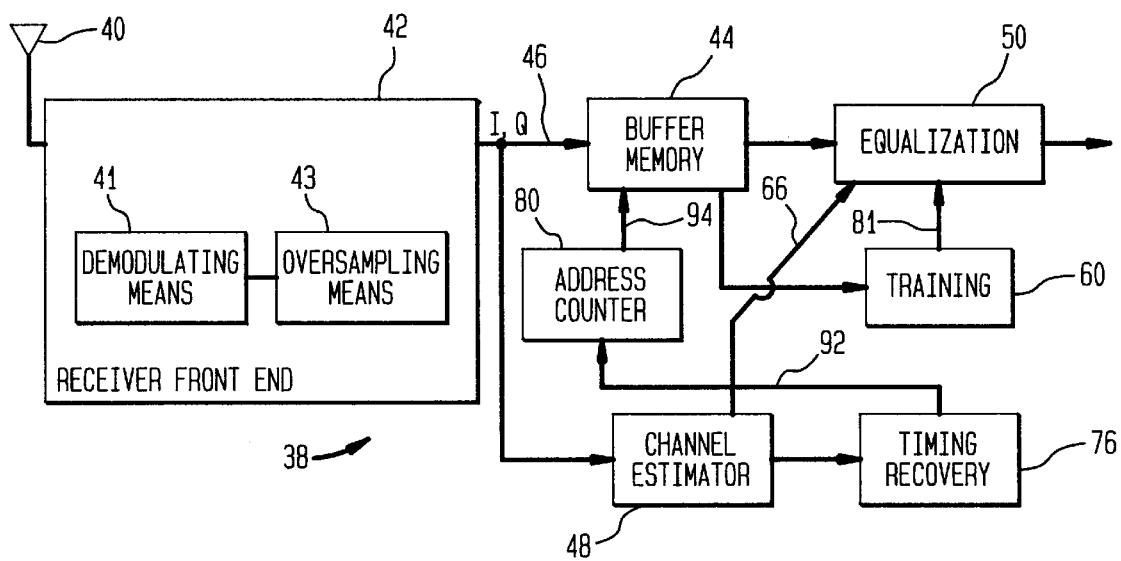
FIG. 2 is a representation of a receiver system according to the principles of the invention.

Referring to FIG. 2, a digital receiver system 38 includes a receiving antenna 40. A receiver front end 42 is coupled to the receiving antenna 40. The receiver front end 42 includes a demodulating means 41 and an oversampling means 43. The receiver front end 42 is configured for QPSK demodulation of the received signal. In the receiver front end 42, the received radio-frequency signal is converted into I and Q baseband signals, and the I and Q baseband signals are oversampled and quantized into digital values. Oversampling (four times in the preferred embodiment) of the I and Q baseband signals is necessary because the timing has not yet been determined.

The digital receiver 38 (FIG. 2) includes a buffer memory component 44 coupled to the receiver front end 42 for receiving the oversampled baseband signal 46 (the I and Q components). This reduces complexity and enables reduced transmission overhead.

A channel estimation component 48 is coupled to the receiver front end 42 to receive the baseband signal 46 (I and Q components). The channel estimation component 48 can perform any of a number of conventional channel estimation techniques to determine the channel impulse response. A preferred channel estimation technique includes (i) transmitting a known sync word (e.g., "1011") and (ii) correlating the received version of the transmitted signal with the known sync word. From this, an over-sampled channel impulse response is determined. In accordance with an aspect of the invention, various hypotheses for an optimum burst timing parameter and an optimum symbol timing parameter are tested using this oversampled channel impulse response signal.

Figure 3:
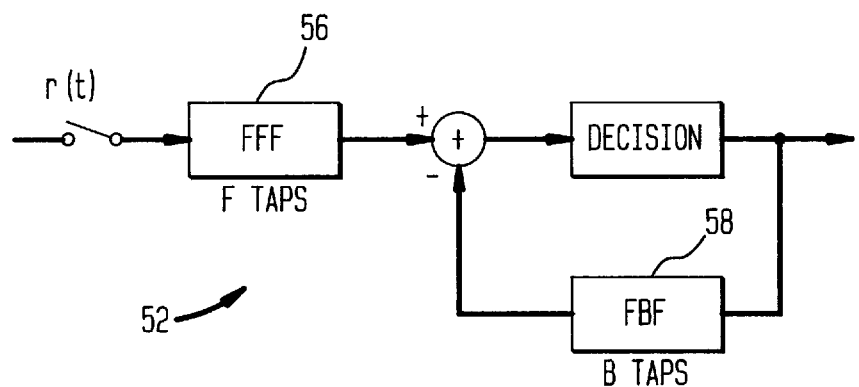
FIG. 3 is a representation of a DFE structure.
Figure 4:
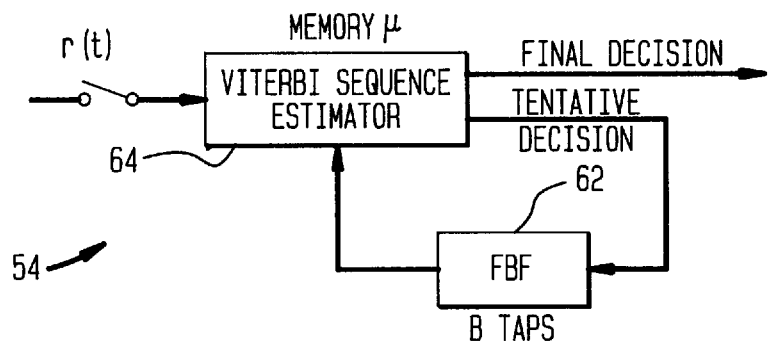
FIG. 4 is a representation of a DDFSE structure.

The digital receiver 38 includes an equalization structure 50 coupled to the buffer memory 44 to receive samples of the baseband signal 46 for equalization. According to the principles of the invention, timing recovery can be accomplished before, rather than during or after, equalization. Two conventional equalization structures are the DFE structure and the DDFSE structure. FIG. 3 depicts a DFE equalizer structure 52 and FIG. 4 depicts a DDFSE equalizer structure 54. Each can be used as the equalization component 50 in the broadband wireless receiver system 38 depicted in FIG. 2.

Referring to FIG. 3, the DFE equalizer structure 52 consists of a feedforward transversal filter 56 and a feedback transversal filter 58. The lengths of the feedforward filter and the feedback filter are denoted F and B, respectively. Both lengths (F and B) are measured in units of symbol periods. The filter tap gains in the DFE equalizer are typically adjusted based on the known minimum mean-square error (MMSE) criterion. Adjusting the filter tap gains in the DFE equalizer requires training with known symbols to solve the tap gain equations through adaptive algorithms, such as a least mean-square (LMS) algorithm or a recursive least squares (RLS) algorithm. The digital receiver 38 embodied as shown in FIG. 2 includes a training mechanism 60 for use in a DFE-type equalization embodiment.

The training mechanism 60 is not necessary if a DDFSE equalizer structure, as shown in FIG. 4, is utilized. Such DDFSE equalizer structure 54 includes a feedback filter 62 and a feedforward section. The feedforward section of the DDFSE equalizer structure 54 includes a Viterbi sequence estimator (VSE) 64 with a memory $\mu$. The number of states in the VSE 64 grows exponentially with $\mu$, e.g., as $4^\mu$ for QPSK. The DDFSE equalizer 54 performs a reduced-state Viterbi algorithm; $\mu$ can be chosen to be smaller than the actual memory length of the channel. The DDFSE feedback filter 62 is used in path metric computations to estimate the residual tail of intersymbol interference (ISI). The DDFSE equalizer 54 does not require training, but requires channel estimation. The path metrics are computed by correlating detected data and the data symbols in the trellis with the estimated channel impulse response (see line 66, FIG. 2).

The equalizer structure 50 (FIG. 2) according to the principles of the invention is capable of handling channels with severe dispersion effects (i.e., up to 100 symbol periods).

The feedback filter (in DFE or in DDFSE) is used to cancel a long string of postcursors. The length (span) of the feedback filter is made to be as long as the maximum channel dispersion, i.e., B=K. The feedback filter is multiplication-free in the sense that the convolution of detected data with the filter tap gains is implemented using adders and/or lookup tables.

A short feedforward section (e.g., the feedforward filter 56 in a DFE structure 52, or the VSE 64 in a DDFSE structure 54) is used to capture multipath energy. The span, S, of the feedforward section for both DFE and DDFSE is defined as (Eq. 2):

$$S = \begin{cases} F & \text{for } DFE \\ \mu + 1 & \text{for } DDFSE \end{cases}$$

In a DDFSE equalizer structure 54 (FIG. 4), it is particularly important to make the span of the feedforward section short because the complexity of the VSE 64 in such feedforward section grows exponentially with $\mu$. Typically S is made to be much less than K, the memory length of the channel. This consequently restricts the role of the feedforward section to capturing (partially) signal energy, rather than cancelling ISI. An important aspect of the invention is to optimumly position the feedforward section of the equalizer structure 50.

Figure 5:
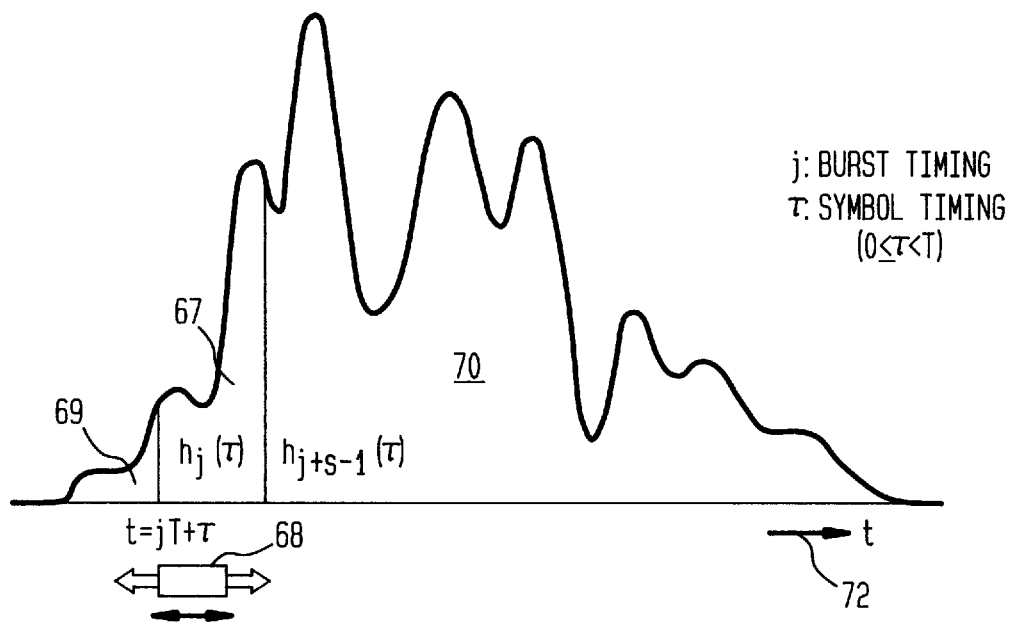
FIG. 5 is a representation of the span of the feedforward section positioned along the time axis according to the principles of the invention.

Optimum symbol timing and burst timing selection is especially important when the channel dispersion length is much larger than the span of the feedforward section of the equalizer. Referring to FIG. 5, the burst timing j determines the amount of signal energy 67 to be captured by the feedforward section 68 of the equalizer as well as the amount of precursor power 69 to be tolerated by the receiver. Postcursor 70 ISI is cancelled by the feedback filter.

As the feedforward section 68 (FIG. 5) of the equalizer is moved back and forth along the time axis 72, the amount of captured signal energy 67 and the amount of captured precursor power 69 is varied. If the span of the feedforward section 68 is positioned too far to the right on the time axis 72, the precursor power 69 will be excessive, resulting in poor performance. On the other hand, if the span of the feedforward section 68 is positioned (timed) too far to the left on the time axis 72, the captured signal energy 67 will be insufficient for good receiver performance.

The choice of timing according to the principles of the invention uses the estimated channel impulse response. Without the timing recovery approach taught herein, the span of the feedforward section of the equalizer in a highly dispersive environment needs to be as long as the memory length of the channel. This is too complex and costly for practical applications.

The timing recovery method according to the principles of the invention finds the burst timing parameter j and the symbol timing parameter $\tau$ that maximize a signal to intersymbol interference plus noise ratio (SINR) index. The SINR indices for DDFSE (Eq. 3) and DFE (Eq. 4), respectively, are as follows:

$$\text{for } DDFSE: \quad \gamma_1 = \frac{\Sigma |\hat{h}_k(\tau)|^2, \text{ for } k \text{ equals } j \text{ to } j + \mu}{\Sigma |\hat{h}_k(\tau)|^2 + 2\hat{N}_o, \text{ for } k \text{ equals } -K_1 \text{ to } j - 1} ;$$

$$\text{for } DFE: \quad \gamma_2 = \frac{|\hat{h}_j(\tau)|^2}{\Sigma |\hat{h}_k(\tau)|^2 + 2\hat{N}_o, \text{ for } k \text{ equals } -K_1 \text{ to } j - 1} .$$

Hat signs above variables in the equations above indicate quantities estimated using the sync word. The first term in the denominator of both Eq. (3) and Eq. (4) represents the estimated precursor power 69 (FIG. 5).

Generation of the SINR index (either $\gamma_1$ or $\gamma_2$) utilizes an estimation of the noise power $2N_o$, which is the second term in the denominator of both Eq. (3) and Eq. (4). However, the noise power can be preselected and set relative to the AGC level (e.g., 30 dB below total received signal power, regardless of the actual input signal to noise ratio) with minimal degradation in performance.

Referring to FIG. 2, the digital receiver 38 includes a timing recovery component 76 coupled to the channel estimation component 48. The timing recovery component 76 presents a structure based on the type and structure of the equalization component 50. The timing recovery component 76 operates according to Eq. (3) to maximize the SINR index $\gamma_1$ if a DDFSE equalization structure is implemented. The timing recovery component 76 operates according to Eq. (4) to maximize the SINR index $\gamma_2$ if a DFE equalization structure is implemented. The timing recovery component 76 in either arrangement maximizes the SINR index to determine the optimum burst timing parameter j and the optimum symbol timing parameter $\tau$ that maximize performance of the equalization component 50. These parameters are determined based on the oversampled channel impulse response generated in the channel estimation component 48.

The timing recovery component 76 chooses the timing to maximize the calculated SINR index. The timing recovery component 76 generates and passes the optimum burst timing parameter and the optimum symbol timing parameter to an address counter 80.

The address counter 80 determines one or more addresses based on the optimum burst and symbol timing parameters for recovering samples of the baseband signal 46 (I and Q components) from the buffer memory component 44. Thus, timing is recovered prior to training in the training component 60, and prior to equalization in the equalization component 50.

The timing-recovered baseband signal is passed from the buffer memory component 44 to a training component 60 for training the equalization component 50, if the equalization component is embodied to perform a DFE technique. After training, the trained DFE tap gains 81 are passed from the training component 60 to the equalization component 50. There is no training component necessary for an equalization component 50 performing a DDFSE technique. If the equalization component 50 is embodied to perform a DDFSE technique, then the oversampled channel impulse response is passed directly from the channel estimation component 48 to the equalization component 50, as shown by arrow 66 in FIG. 2.

Figure 6:
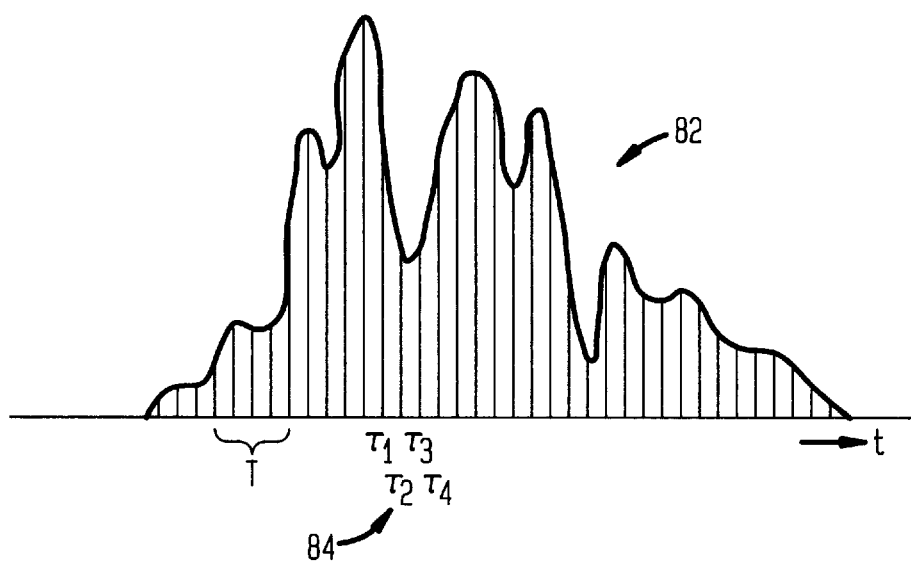
FIG. 6 is a representation of an oversampled channel impulse response according to the principles of the invention.

For purposes of illustrating practice of the invention with an exemplary DDFSE equalization component embodiment, and not by way of limitation, burst timing and symbol timing parameters are generated in the timing recovery component 76 based on the oversampled channel impulse response output from the channel estimation component 48 as follows. Referring to FIG. 6, a four-times oversampled channel impulse response h(t), 82, where t=jT+$\tau$, is obtained in the channel estimation component 48 (FIG. 2). "T" is the length of one symbol period.

From a four-times oversampled channel estimate 82 there are four possible symbol timing phases 84 to select from: $\tau_1$, $\tau_2$, $\tau_3$, and $\tau_4$. Each symbol timing phase is selected and tested as a hypothesis. The best burst timing parameter is tested by calculating the SINR index $\gamma_1$, from Eq. (3), for each incremental value of j and identifying the j at which the SINR index $\gamma_1$ is largest, for that selected timing phase $\tau_1$, $\tau_2$, $\tau_3$, or $\tau_4$ in this example. The timing recovery component 76 (FIG. 2) incrementally shifts from a selected timing phase 86 to a next selected timing phase 88, and to a next selected timing phase 90, as shown in FIG. 7.

Figure 7:
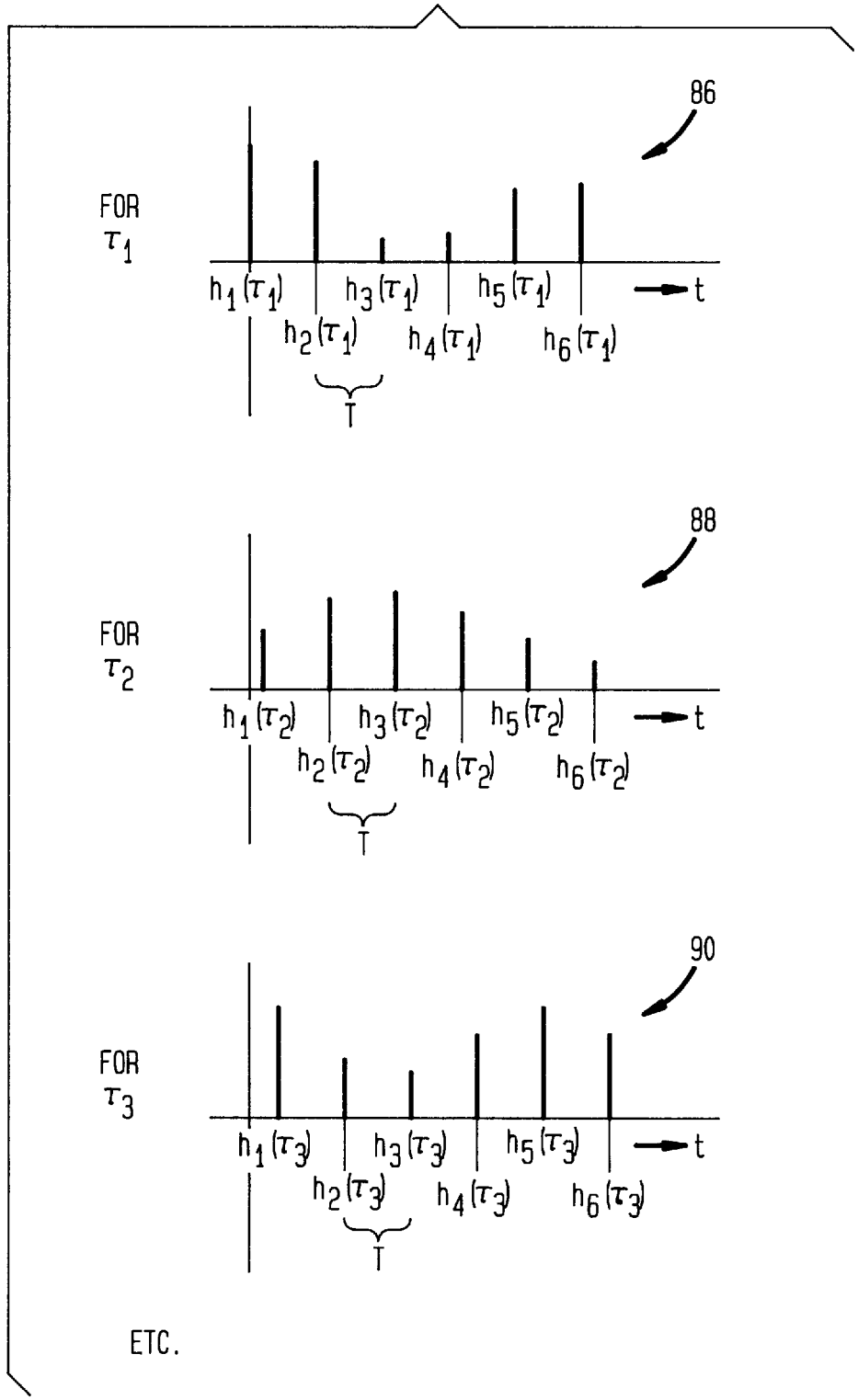
FIG. 7 is a representation of timing phases being sequentially tested to maximize equalization in a timing recovery process according to the principles of the invention.

Testing to find the best burst timing parameter is repeated for the next timing phase 88 (FIG. 7). That is, for that next selected timing phase, the burst timing is tested by calculating the SINR index $\gamma_1$ for each incremental value j, and then choosing the j that has the largest SINR index $\gamma_1$, according to Eq. (3), in this exemplary DDFSE equalizer embodiment.

This process is repeated for all the timing phases, $\tau_1$, $\tau_2$, $\tau_3$, and $\tau_4$ in this example.

After the best SINR index is selected at a value of j for each possible timing phase τ, then these best SINR indices are compared to one another. The optimum symbol timing parameter τ is identified by selecting the highest value of the SINR index, which is associated with a particular τ and value of j. That particular τ and that particular j are used as the symbol timing parameter τ and the burst timing parameter j, respectively.

Such symbol timing parameter τ and burst timing parameter j are output by the timing recovery component 76 in the digital receiver 38. The symbol timing parameter and the burst timing parameter are passed 92 to the address counter 80. One or more addresses 94 are determined based on the symbol timing parameter and the burst timing parameter to obtain signal samples at the best burst and symbol timing from an oversampled received signal stored in the buffer memory component 44.

After the optimum timing is recovered and set, data can be read from the buffer memory component 44 according to the optimum timing, determined according to the principles of the invention, and processing operation can be initiated to detect actual data according to the type of equalization implemented (DDFSE or DFE). If the equalization component 50 of the digital receiver 38 is embodied as a DFE structure, the equalizer is trained with the training component 60 before processing operation is initiated in the equalization component 50.

It is contemplated that the principles of the invention are applicable to symbol-spaced equalizer structures (as described in the above examples) and to fractionally-spaced equalizer structures.

While several particular forms of the invention have been illustrated and described, it will also be apparent that various modifications can be made without departing from the spirit and scope of the invention.

What is claimed is:

1. A broadband wireless radio receiver for receiving a QPSK modulated radio signal including one or more packets of user information and overhead symbols, comprising:
    means for demodulating the radio signal into a baseband signal;
    means for oversampling the baseband signal coupled to the demodulating means;
    channel estimation means for generating a channel impulse response signal based on the baseband signal;
    timing recovery means for generating a symbol timing parameter and a burst timing parameter based on the channel impulse response signal;
    memory means for storing an oversampled baseband signal and outputting samples of the baseband signal based on the symbol timing parameter and the burst timing parameter; and
    an equalizer for receiving the samples of the baseband signal from the memory means and outputting detected data, the equalizer including a feedback section and a feedforward section.

2. The receiver of claim 1, wherein:
    the feedforward section is selected from the group consisting of a transversal filter and a Viterbi sequence estimator with a memory.

3. The receiver of claim 1, wherein:
    the feedback filter is used for cancelling postcursors and has a feedback span equal to the maximum channel dispersion, and
    the feedforward section is used for capturing multipath energy and has a feedforward span which is based on the channel impulse response signal.

4. The receiver of claim 1, wherein:
    the one or more packets are in a form selected from the group consisting of isochronous and asynchronous packets.

5. The receiver of claim 1, wherein:
    each packet includes a preselected number of information bits.

6. The receiver of claim 1, wherein:
    the overhead symbols include a sync word having a preselected length.

7. The receiver of claim 6, wherein:
    the sync word is used for estimating channel impulse response and optimum equalizer timing prior to equalization.

8. The receiver of claim 1, wherein:
    the timing recovery means determines the symbol timing parameter and the burst timing parameter using (a) an estimate of the noise power and (b) an estimate of the channel impulse response.

9. The receiver of claim 1, wherein:
    the feedback section has a feedback span equal to the length of the channel impulse response, and
    the feedforward section has a feedforward span less than the length of the channel impulse response.

10. A method for detecting data for use in a broadband wireless radio receiver which includes an equalizer, the equalizer including a feedforward section and a feedback section, comprising the following steps:
    (A) generating a channel impulse response signal based on a baseband signal;
    (B) generating a symbol timing parameter and a burst timing parameter based on the channel impulse response signal;
    (C) outputting samples of the baseband signal using the symbol timing parameter and the burst timing parameter; and
    (D) equalizing samples of the baseband signal to detect data.

11. The method of claim 10, wherein step (B) includes the step of:
    maximizing a signal to intersymbol interference plus noise ratio (SINR) index to determine the symbol timing parameter and the burst timing parameter.

12. The method of claim 10, wherein:
    step (B) is performed before step (D).

13. The method of claim 10, further comprising the step:
    after step (B), training the equalizer.

14. The method of claim 13, wherein training the equalizer includes:
    setting taps of the feedforward section and the feedback section.

15. The method of claim 10, further comprising the step:
    passing the channel impulse response signal to the equalizer.

16. The method of claim 10, wherein step (B) includes the steps:
    selecting a possible symbol timing parameter based on an oversampled version of the channel impulse response signal;
    calculating a signal to intersymbol interference plus noise ratio (SINR) index for incremental values of possible burst timing parameters; and
    identifying the burst timing parameter at which the SINR index is largest for the selected possible symbol timing parameter.

17. The method of claim 16, wherein step (B) further includes the step:

incrementally shifting from the selected possible symbol timing parameter to a next selected possible symbol timing parameter.

18. The method of claim 17, further comprising the step:

repeating step (B) for one or more possible symbol timing parameters.

19. The method of claim 18, further comprising the steps:

after identifying the burst timing parameter at which the SINR index is largest for each of the selected possible symbol timing parameters, comparing the largest SINR indices at the identified burst timing parameters to each other; and determining the optimum symbol timing parameter and the optimum burst timing parameter based on the largest SINR index.

* * * * *